(12) United States Patent
Belanger et al.

(10) Patent No.: US 10,668,900 B2
(45) Date of Patent: Jun. 2, 2020

(54) MECHANISM FOR SELECTIVELY OPENING/CLOSING A VEHICLE WASH COMPONENT INLET OPENING

(71) Applicant: WashMe Properties, LLC, Northville, MI (US)

(72) Inventors: Michael J. Belanger, Northville, MI (US); Barry S. Turner, Novi, MI (US); David L. Tognetti, Howell, MI (US)

(73) Assignee: WASHME PROPERTIES, LLC, Northville, MI (US)

( * ) Notice: Subject to any disclaimer, the term of this patent is extended or adjusted under 35 U.S.C. 154(b) by 326 days.

(21) Appl. No.: 15/589,401

(22) Filed: May 8, 2017

(65) Prior Publication Data

US 2017/0320470 A1    Nov. 9, 2017

Related U.S. Application Data

(60) Provisional application No. 62/333,507, filed on May 9, 2016.

(51) Int. Cl.
*B60S 3/00* (2006.01)
*F04D 29/42* (2006.01)
(Continued)

(52) U.S. Cl.
CPC .............. *B60S 3/002* (2013.01); *B60S 3/04* (2013.01); *E05F 15/53* (2015.01); *F04D 17/16* (2013.01);
(Continued)

(58) Field of Classification Search
CPC .. B60S 3/002; B60S 3/04; F26B 21/12; F26B 21/001; F26B 2210/12; F04D 29/703;
(Continued)

(56) References Cited

U.S. PATENT DOCUMENTS 1,938,241 A * 12/1933 Banfield ................. F23L 13/00
110/286
2,649,272 A * 8/1953 Barbato ................ F24F 13/105
251/212
(Continued)

FOREIGN PATENT DOCUMENTS

CH          637457 A5 *  7/1983  .............. F16K 3/03
GB          253698 A  *  6/1926  .............. F02M 1/00
GB          865460 A  *  4/1961

*Primary Examiner* — Sizo B Vilakazi
*Assistant Examiner* — Brian R Kirby
(74) *Attorney, Agent, or Firm* — Dickinson Wright, PLLC

(57) ABSTRACT

A dryer assembly for a vehicle wash system for emitting high velocity air onto a vehicle exterior includes a housing having an air inlet and an outlet. The air inlet is in communication with a motor assembly having an operating and a non-operating mode. The assembly also includes a gate mechanism in communication with the air inlet. The gate mechanism includes a plurality of pedals that are each pivotable between a first position and a second position. The gate mechanism is in communication with a controller, which directs movement of the plurality of pedals from the first position where the plurality of pedals surround the inlet opening such that air can flow into the housing and the second position where each of the plurality of pedals covers a portion of the inlet opening such that in their entirety the plurality of pedals obstruct the inlet opening to prevent air for flowing into the housing.

33 Claims, 9 Drawing Sheets

(51) Int. Cl.
| | |
|---|---|
| *F26B 21/12* | (2006.01) |
| *F04D 29/70* | (2006.01) |
| *F04D 27/00* | (2006.01) |
| *E05F 15/53* | (2015.01) |
| *B60S 3/04* | (2006.01) |
| *F04D 17/16* | (2006.01) |
| *F04D 25/06* | (2006.01) |
| *F04D 29/28* | (2006.01) |
| *F04D 29/46* | (2006.01) |
| *F16K 3/02* | (2006.01) |
| *F16K 3/03* | (2006.01) |
| *F26B 21/00* | (2006.01) |

(52) U.S. Cl.
CPC ........... *F04D 25/06* (2013.01); *F04D 27/003* (2013.01); *F04D 29/281* (2013.01); *F04D 29/4213* (2013.01); *F04D 29/464* (2013.01); *F04D 29/703* (2013.01); *F16K 3/029* (2013.01); *F16K 3/0254* (2013.01); *F16K 3/03* (2013.01); *F26B 21/001* (2013.01); *F26B 21/12* (2013.01); *F05D 2250/51* (2013.01); *F26B 2210/12* (2013.01)

(58) Field of Classification Search
CPC .... F04D 29/4213; F04D 27/003; F04D 17/16; F04D 25/06; F04D 29/464; F04D 29/281; F16K 3/0254; F16K 3/029; F16K 3/03; E05F 15/53; F05D 2250/51
USPC .......................................................... 34/666
See application file for complete search history.

(56) References Cited

U.S. PATENT DOCUMENTS

| | | | | | |
|---|---|---|---|---|---|
| 2,788,009 | A | * | 4/1957 | Lones | B60S 3/04 134/102.2 |
| 2,831,627 | A | * | 4/1958 | Brunner | F04D 27/0269 415/123 |
| 3,159,179 | A | * | 12/1964 | De Lain | F16K 3/03 137/545 |
| 3,367,040 | A | * | 2/1968 | Vani | B60S 3/002 34/571 |
| 3,396,904 | A | * | 8/1968 | Janette | F04D 29/4213 251/78 |
| 4,472,889 | A | * | 9/1984 | Hanna | B60S 3/002 15/316.1 |
| 4,513,948 | A | * | 4/1985 | Konig | F16K 3/03 251/212 |
| 4,817,301 | A | * | 4/1989 | Belanger | B60S 3/002 15/316.1 |
| 4,882,826 | A | * | 11/1989 | Belanger | A47L 5/22 29/527.1 |
| 5,034,181 | A | * | 7/1991 | Billiu | B29B 11/16 264/102 |
| 6,449,870 | B1 | * | 9/2002 | Perez | A45D 20/12 34/96 |
| 6,530,115 | B2 | * | 3/2003 | MacNeil | B60S 3/002 15/316.1 |
| 7,284,296 | B2 | * | 10/2007 | McElroy | B60S 3/002 15/312.1 |
| 7,565,753 | B2 | * | 7/2009 | Christopher | B60S 3/002 34/270 |
| 8,011,114 | B2 | * | 9/2011 | Johnson | F26B 21/001 34/413 |
| 8,397,401 | B1 | * | 3/2013 | Johnson | F26B 21/001 34/406 |
| 8,621,707 | B2 | * | 1/2014 | MacNeil | B60S 3/002 15/301 |
| 8,684,676 | B1 | * | 4/2014 | Kirkpatrick | F04D 29/281 415/151 |
| 8,955,819 | B2 | * | 2/2015 | Landry | B65D 90/205 251/212 |
| 9,206,911 | B1 | * | 12/2015 | Daniels | F16K 27/045 |
| 10,299,642 | B2 | * | 5/2019 | Buchanan | F04D 25/08 |
| 2002/0046758 | A1 | * | 4/2002 | Caldwell | B60S 3/002 134/56 R |
| 2005/0235521 | A1 | * | 10/2005 | Dollhopf | B60S 3/002 34/666 |
| 2006/0261303 | A1 | * | 11/2006 | Thomas | F02D 9/14 251/212 |
| 2009/0095350 | A1 | * | 4/2009 | Bauman | F16K 3/03 137/1 |
| 2010/0150544 | A1 | * | 6/2010 | Koop | G03B 9/08 396/453 |
| 2011/0146250 | A1 | * | 6/2011 | Vanvolsem | F01N 3/031 60/297 |
| 2017/0240142 | A1 | * | 8/2017 | Belanger | B60S 3/04 |

* cited by examiner

MECHANISM FOR SELECTIVELY OPENING/CLOSING A VEHICLE WASH COMPONENT INLET OPENING

CROSS-REFERENCE TO RELATED APPLICATIONS

The present application claims priority to U.S. Provisional Patent Application Ser. No. 62/333,507, filed May 9, 2016, and entitled "A Mechanism for Selectively Opening/Closing a Vehicle Wash Dryer Inlet Opening", the disclosure of which is hereby incorporated by reference as though set forth fully herein.

TECHNICAL FIELD

The present disclosure relates generally to a dryer assembly for a vehicle wash system. More particularly, the present disclosure relates to a dryer assembly for a vehicle wash system having a controllable gate mechanism for opening/closing a dryer inlet opening that yields improvements in energy efficiency.

BACKGROUND OF THE DISCLOSURE

Assemblies for blowing liquids from a vehicle exterior are well known and typically include a plenum for distributing air to a plurality of nozzles, which in turn emit air toward a vehicle. The plenum is supplied air by a blower system having an inlet for drawing air in. The plenum then supplies pressurized air to the nozzles. The blower system typically includes an impeller that is rotated in a housing by an electric motor. The impeller can act as a pump or compressor to pressurize air as it enters the plenum and then force it to and out the nozzles.

These high volume air blowers are known to be quite noisy during operation and also consume considerable electric power when running at full capacity. As is also known, there are significant periods during operation of a vehicle wash where there is no demand for a dryer system to blow liquid from a vehicle, i.e., when no vehicles are passing through the vehicle wash system or are being treated by other wash components. As it is generally detrimental to an electric motor to frequently start and stop, approaches for reducing the airflow output from the device without shutting off the motor have been attempted.

Among these approaches have included pivoted damper plates disposed at the blower inlet (or the outlet) to vary flow through the device. Such an approach yields a bulky and complicated device particularly since the inclusion of a rotatable gate must still accommodate a safety mesh typically installed over the inlet to prevent objects from entering the plenum or a person from reaching into the blower interior, which could result in an injury. In operation, these dampers generally rotate 90 degrees between a closed position where the faces of the dampers generally overlie the blower inlet and an open position where only the edges of the dampers face the blower inlet such that the air inlet is substantially exposed.

Another approach involves mounting a sliding gate adjacent the blower inlet, which may be moved linearly to cover/expose the inlet. However, this arrangement likewise is complex and bulky requiring space for the gate to slide to one side of the blower inlet such that it is fully exposed to allow air to enter the housing. Thus, a significant range of movement is required to slide the gate to open and close the inlet opening, which must be accomplished against large frictional resistance.

While other approaches for reducing/limiting dryer output when unnecessary have also been devised, they all suffer from a variety of disadvantages. For example, these approaches often fail to provide an efficient seal between the closure mechanism and the blower inlet, which still results in the motor operating unnecessarily at all times as air can still be drawn into the air inlet. This inefficient seal can even cause the blower motor to work harder, when the gate mechanism is disposed over which can decrease the life of the blower. Additionally, these approaches are generally bulky and thus expensive which makes them disadvantageous.

SUMMARY OF THE DISCLOSURE

It is therefore an aspect of the present disclosure to provide a blower assembly with an improved gate mechanism for selectively opening and closing an inlet opening to prevent air from being drawn into the blower assembly when the output of air is not needed.

It is another aspect of the present disclosure to provide a blower assembly with an improved gate mechanism that decreases the need for electrical power usage and provides improved power efficiency.

It is still another aspect of the present disclosure to provide a blower assembly with an improved gate mechanism that decreases the typical cost of operation.

It is still yet another aspect of the disclosure to provide a blower assembly with an improved gate mechanism that can more effectively seal a blower air inlet in a closed position to prevent air from being drawn therein.

In accordance with the above and the other aspects, an improved blower assembly is provided. The blower assembly includes a housing having an air inlet and an outlet. The air inlet is in communication with a motor assembly to draw air into the housing. The assembly includes a gate mechanism in communication with the air inlet. The gate mechanism includes a plurality of pedals that are configured to move substantially in a single plane between a first position where the plurality of pedals are position to allow air to flow through the air inlet and a second position where the plurality of pedals are substantially disposed over the air inlet to block air from flowing into the housing through the air inlet.

BRIEF DESCRIPTION OF THE DRAWINGS

Other aspects of the present disclosure will be readily appreciated, as the same become better understood by reference to the following detailed description when considered in connection with the accompanying drawings wherein.

DETAILED DESCRIPTION OF THE DISCLOSURE

Detailed examples of the present disclosure are disclosed herein; however, it is to be understood that the disclosed examples are merely exemplary and may be embodied in various and alternative forms. It is not intended that these examples illustrate and describe all possible forms of the disclosure. Rather, the words used in the specification are words of description rather than limitation, and it is understood that various changes may be made without departing from the spirit and scope of the disclosure. As those of ordinary skill in the art will understand, various features of the present disclosure are illustrated and described with reference to the Figures and may be combined with features illustrated in one or more other Figures to produce examples of the present disclosure that are not explicitly illustrated or described. The combinations of features illustrated provide representative examples for typical applications. However, various combinations and modifications of the features consistent with the teachings of the present disclosure may be desired for particular applications or implementations.

Figure 1:
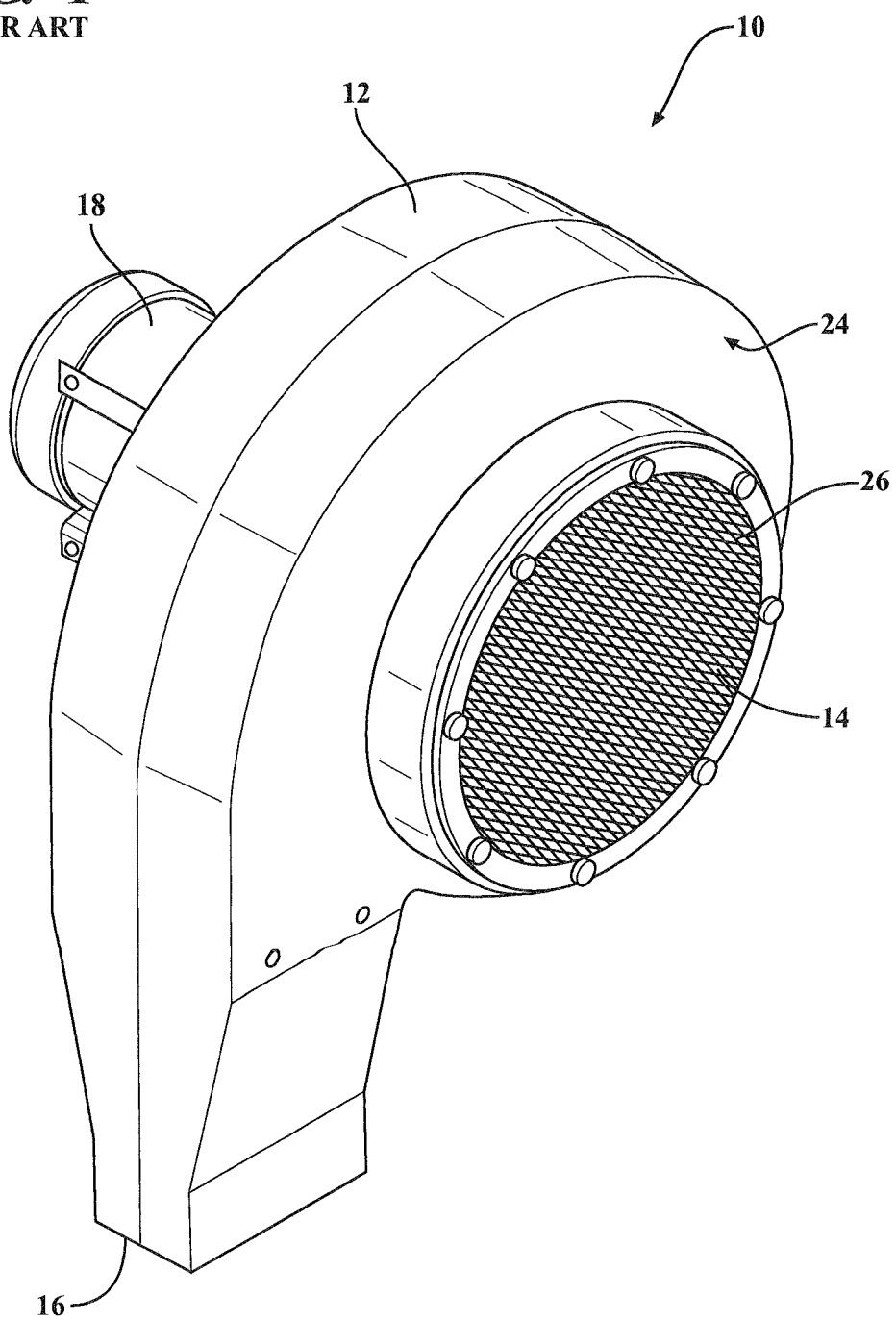
FIG. 1 is a perspective view of a dryer unit constructed in accordance with known prior art.
Figure 2:
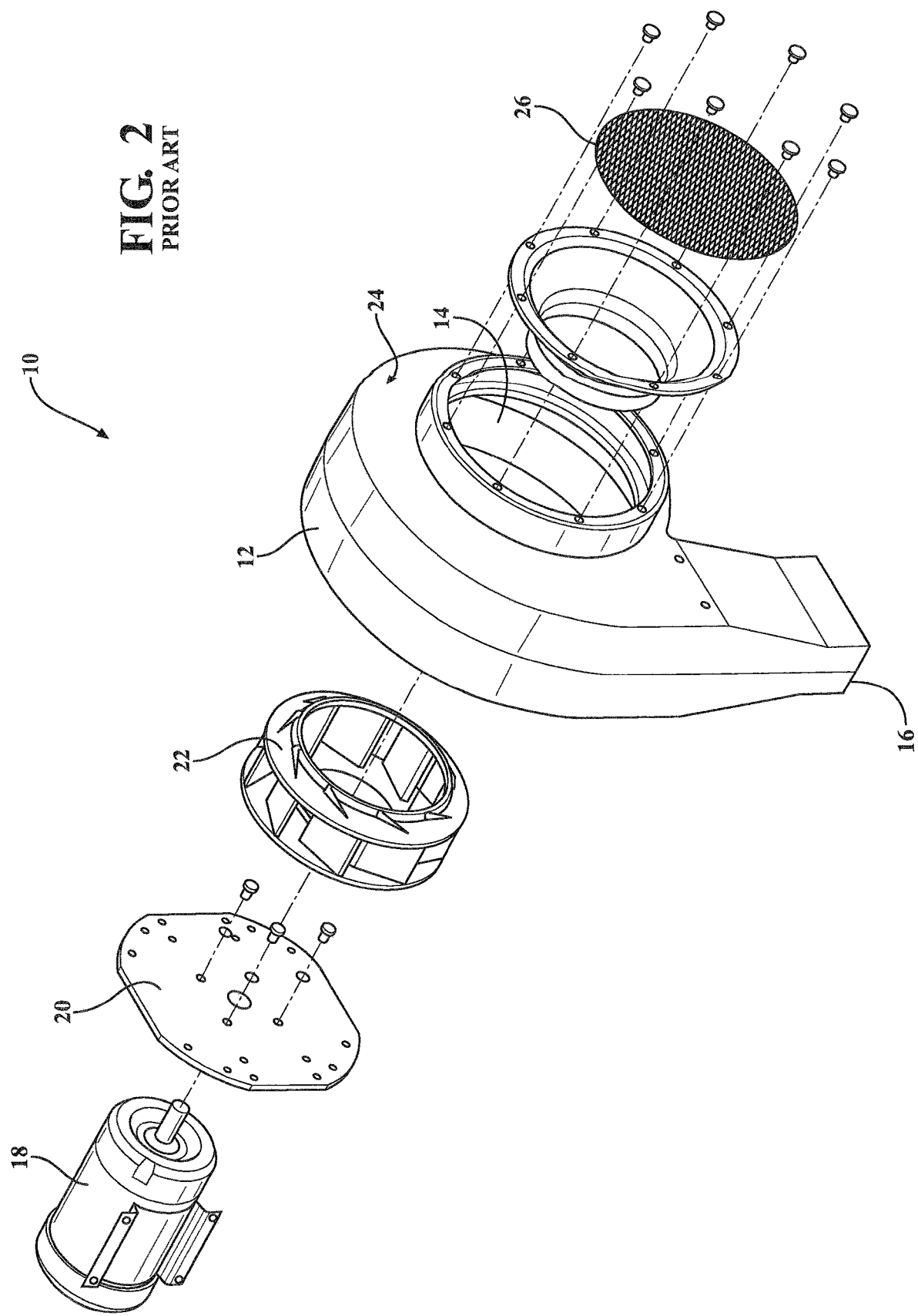
FIG. 2 is an exploded view of a dryer unit constructed in accordance with known prior art.

FIGS. 1 and 2 illustrate a conventional dryer unit 10 constructed in accordance with the prior art. As shown, the dryer unit 10 includes a housing 12 having an air inlet 14 and an air outlet 16. The air inlet 14 includes a motor unit 18 mounted to a housing back plate 20, which in turn is secured to the housing 12. The motor unit 18 is in communication with an impeller 22 disposed in an upper portion 24 of the housing 12. The motor unit 18 can effectuate rotation of the impeller 22 to draw air into the housing 12 through the air inlet 14. The inlet opening 14 includes a screen layer 26 disposed thereover such that debris will not be drawn into the housing 12 when air is drawn in through the inlet opening 14. Air drawn into the housing 12 through rotation of the impeller 22 is emitted through the air outlet 16. The motor unit 18 is communication with a controller to effect operation of the motor unit 16.

Figure 3:
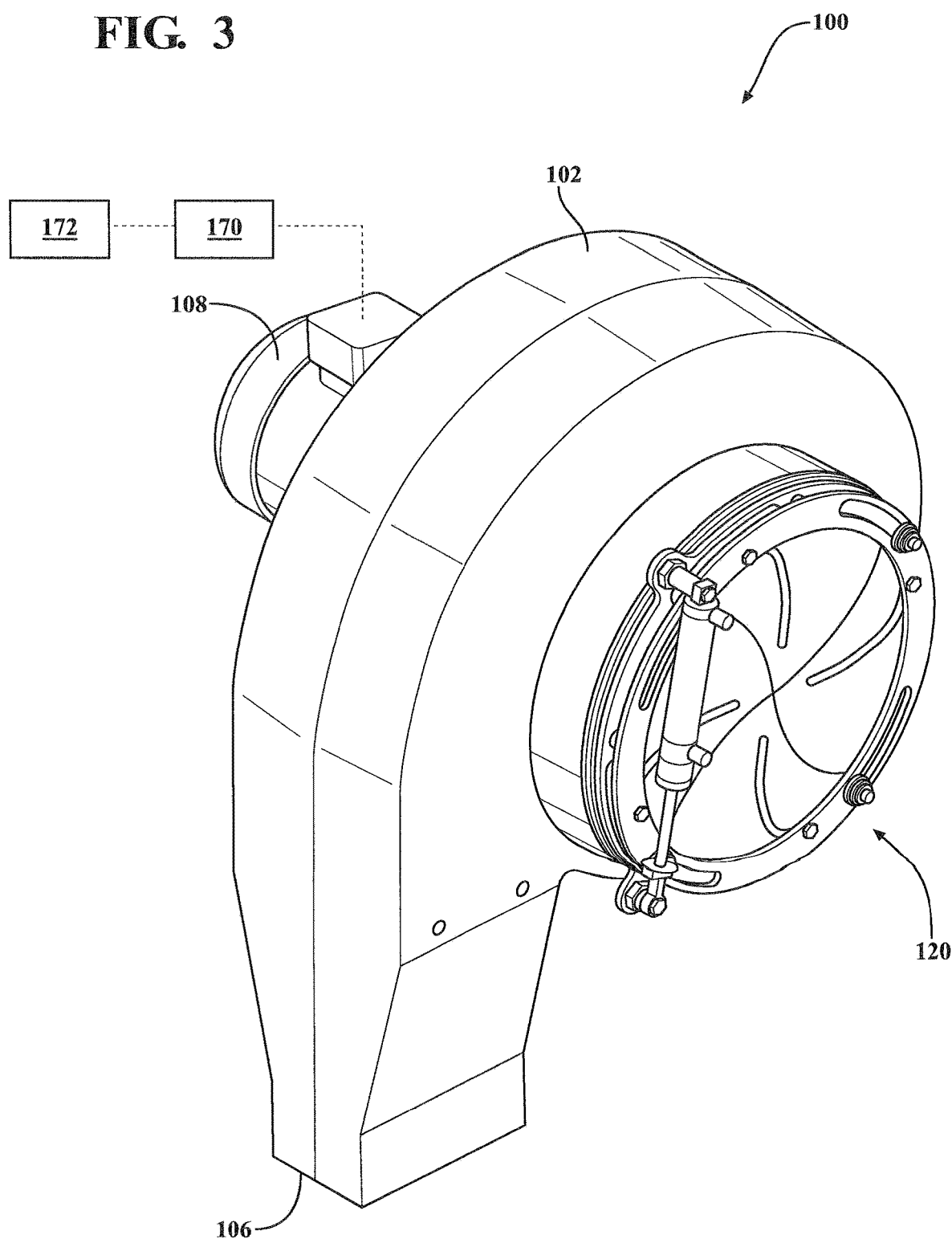
FIG. 3 is a perspective view of a dryer unit with an inlet gate mechanism in a closed position in accordance with an aspect of the present disclosure.
Figure 4:
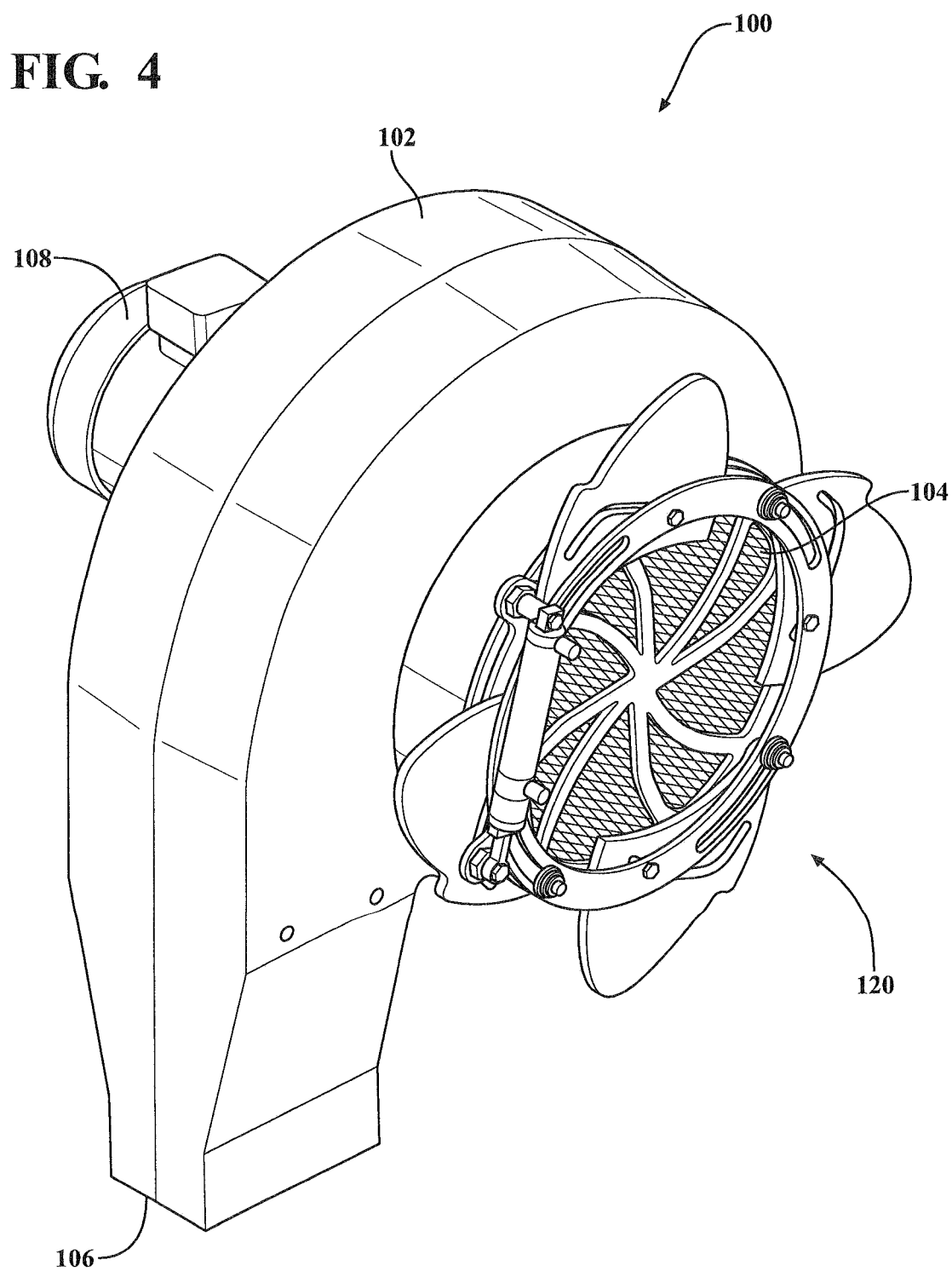
FIG. 4 is a perspective view of a dryer unit with an inlet gate mechanism in an open position in accordance with an aspect of the present disclosure.

FIGS. 3 and 4 illustrate a dryer unit 100 in accordance with aspects of the present disclosure. According to an aspect, the dryer unit 100 may be part of a dryer assembly that is utilized as part of a vehicle wash system to remove water from a vehicle exterior. It will be appreciated that the dryer unit 100 may be incorporated into various types of vehicle wash systems, including automatic, in-bay and/or self-service wash systems. It will also be appreciated that the dryer unit 100 may be utilized in connection with a variety of other applications. The dryer unit 100 can have a plurality of individual dryer units mounted in different locations to emit air to contact different vehicle surfaces. The dryer unit 100 may be stationary or it may be pivotable as set forth in Applicant's concurrently filed patent application entitled "A Vehicle Rinse Assembly For Emitting Air and Water", Ser. No. 15/589,499, which is hereby incorporated by reference as though set forth fully herein.

As shown, the dryer unit 100 can include a housing 102 with an air inlet 104 and an air outlet 106. The dryer unit 100 can include a motor unit 108 that is secured to the housing 102 in a variety of known fashions. According to an aspect, the motor unit 108 may be in communication with an impeller 110 located within the housing 102 and disposed adjacent the air inlet 104 to draw air into the housing 102 as the impeller 110 rotates. It will be appreciated that the motor unit 108 could be of any of a variety of suitable types. It will also be appreciated that a variety of other suitable ways to draw air into the housing may be employed. Air drawn into the housing 102 can be emitted through the air outlet 106 and directed to contact a vehicle exterior. The air outlet may have a variety of different configurations. It will be appreciated that the housing 102 could have multiple outlets with varying configurations. The housing 102 can be constructed of a variety of different materials. The housing 102 may also be formed of a translucent material such that light sources can be disposed within the housing and light emitted from the light sources can be transmitted through the housing such that it is seen by vehicles in the wash system.

According to an aspect, a gate mechanism 120 may be secured to the housing 102 and configured to communicate with the air inlet 104. As best shown in FIGS. 5 through 9, the gate mechanism 120 can include a sealing gasket 122 that engages an outer surface of the housing 102. The sealing gasket 122 can be formed of elastomeric material or from a variety of other suitable materials. To ensure that air is prevented from being drawn into the housing 102 at the attachment of the gate mechanism 120 to the housing 102. A spoke ring 124 may be aligned with the sealing gasket 122 and secured to the housing 102 such that it remains fixedly secured thereto in on position. The spoke ring 124 may include a plurality of pedal pivots 126 and an inner cylinder mount 128. According to an aspect, a plurality of shutoff pedals 130 may be in rotational communication with the pedal pivots 126 each at a respective inner attachment point 132. Each of the shutoff pedals 130 can include a pedal drive slot 134 formed in a face thereof. Additionally, the spoke ring 124 can include a plurality of pedal drive slot sealing spokes 136 and a plurality of pedal edge sealing spokes 138 each extending generally from a periphery of the spoke ring 124 to a center hub 140 thereof.

According to an aspect, the gate mechanism 120 can include an outer drive ring 142 in rotational engagement with the spoke ring 124. The outer drive ring 142 can include a plurality of drive slots 144 that each receive one of the pedal pivots 126 therein. The outer drive ring 142 can include an outer cylinder mount 146. As shown, a cylinder rod 148 may have a first end 150 secured to the outer cylinder mount 146 and a second end 152 secured to the inner cylinder mount 128. According to another aspect, the outer drive ring 142 can include a plurality of pedal drive pins 154 that are disposed within a respective one of the pedal drive slots 134. The cylinder rod 148 may be in communication with a controller 170 to selectively actuate the cylinder rod 148 between an extended position and a retracted position in order to close or open the air inlet 104 as directed. It will also be appreciated that a variety of other suitable mechanism can be employed to actuate the cylinder rod 148.

Figure 5:
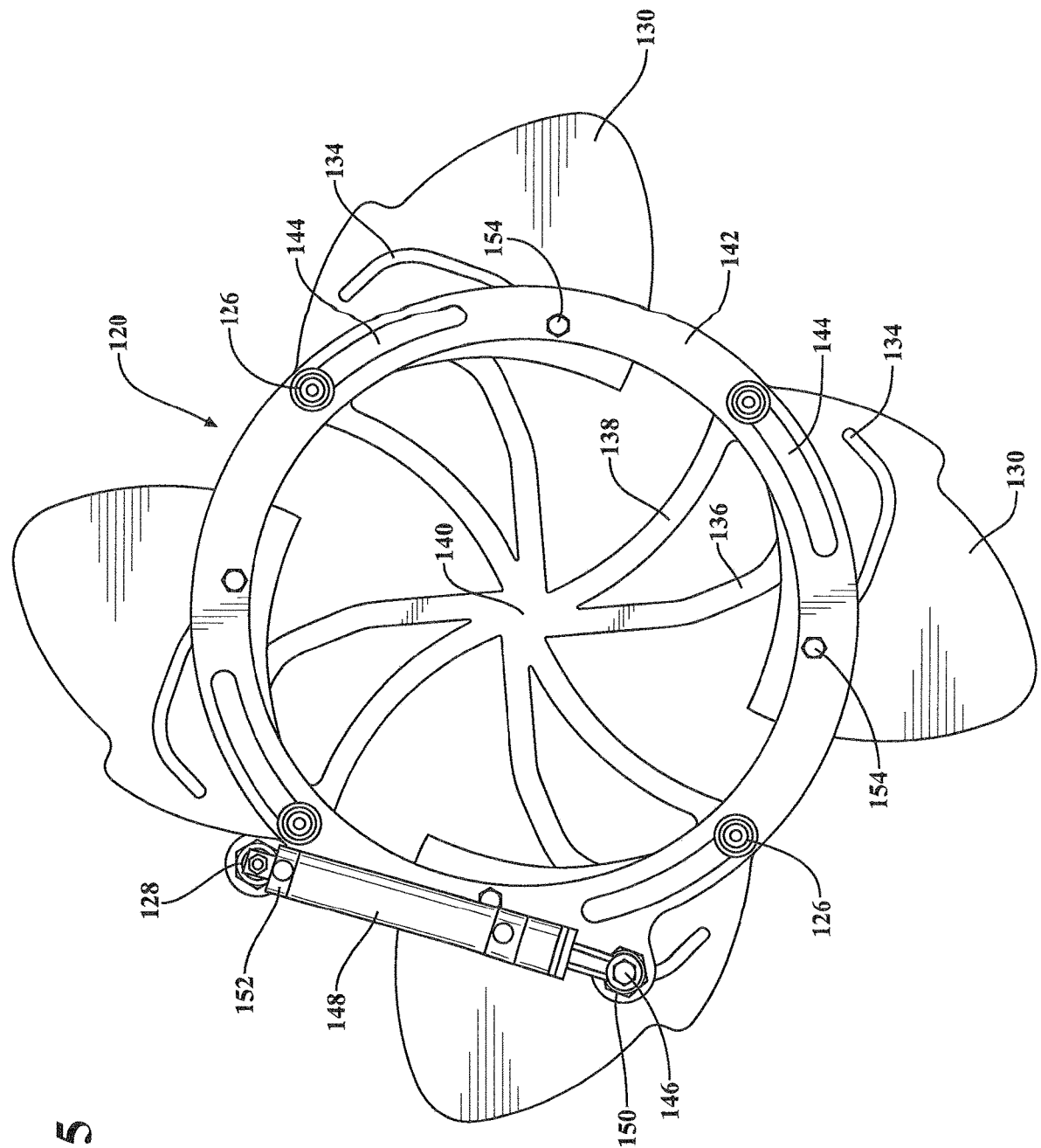
FIG. 5 is a front view of an inlet gate mechanism for a dryer unit in an open position in accordance with an aspect of the present disclosure.

In operation, as shown in FIG. 5, with the gate mechanism 120 in the fully open position, the cylinder rod 148 may be in a retracted position such that the shutoff pedals 130 are rotated about their respective pedal pivots 126 such they are moved to a position where they do not overlie (are retracted away from) the air inlet 104. As shown in FIG. 4, the shutoff pedals 130 may be disposed outside the housing 102 such that space to accommodate their retraction within the housing 102 is not a concern. In the fully open position, the pedal pivots 126 may be located at a first edge 156 of the drive slots 144.

Figure 6:
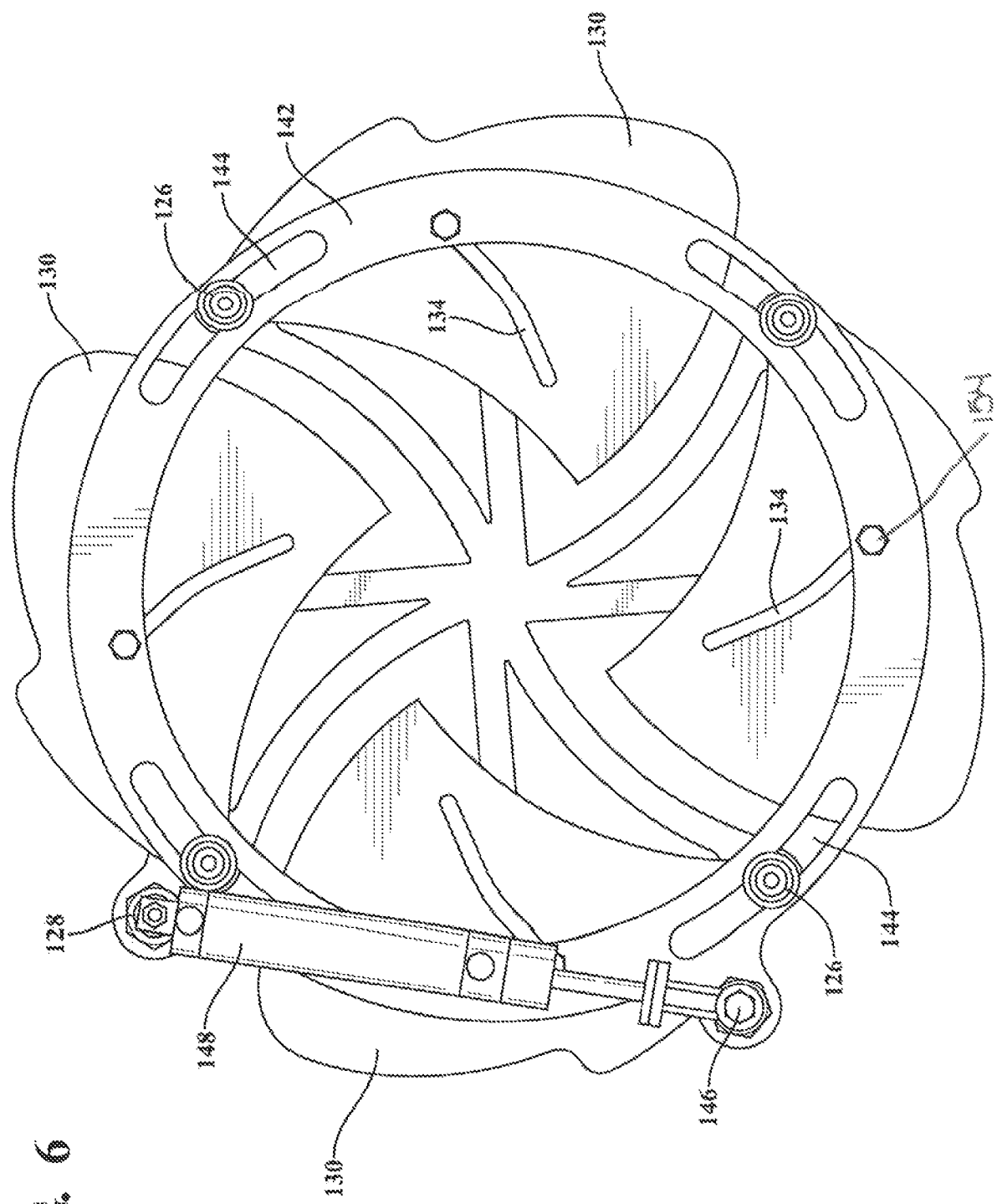
FIG. 6 is a front view of an inlet gate mechanism for a dryer unit in a partially closed position in accordance with an aspect of the present disclosure.
Figure 7:
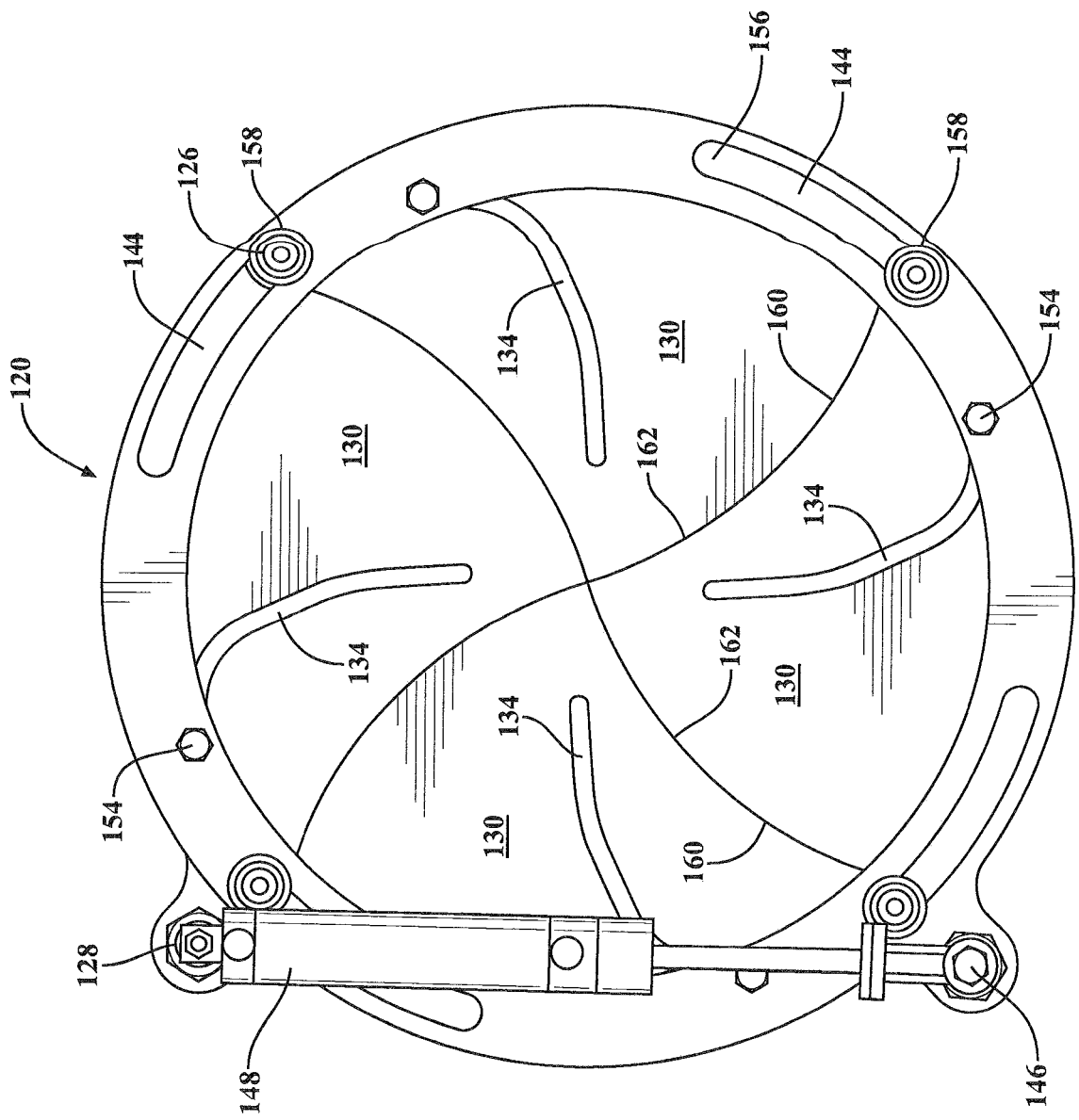
FIG. 7 is a front view of an inlet gate mechanism for a dryer unit in a closed position in accordance with an aspect of the present disclosure.
Figure 8:
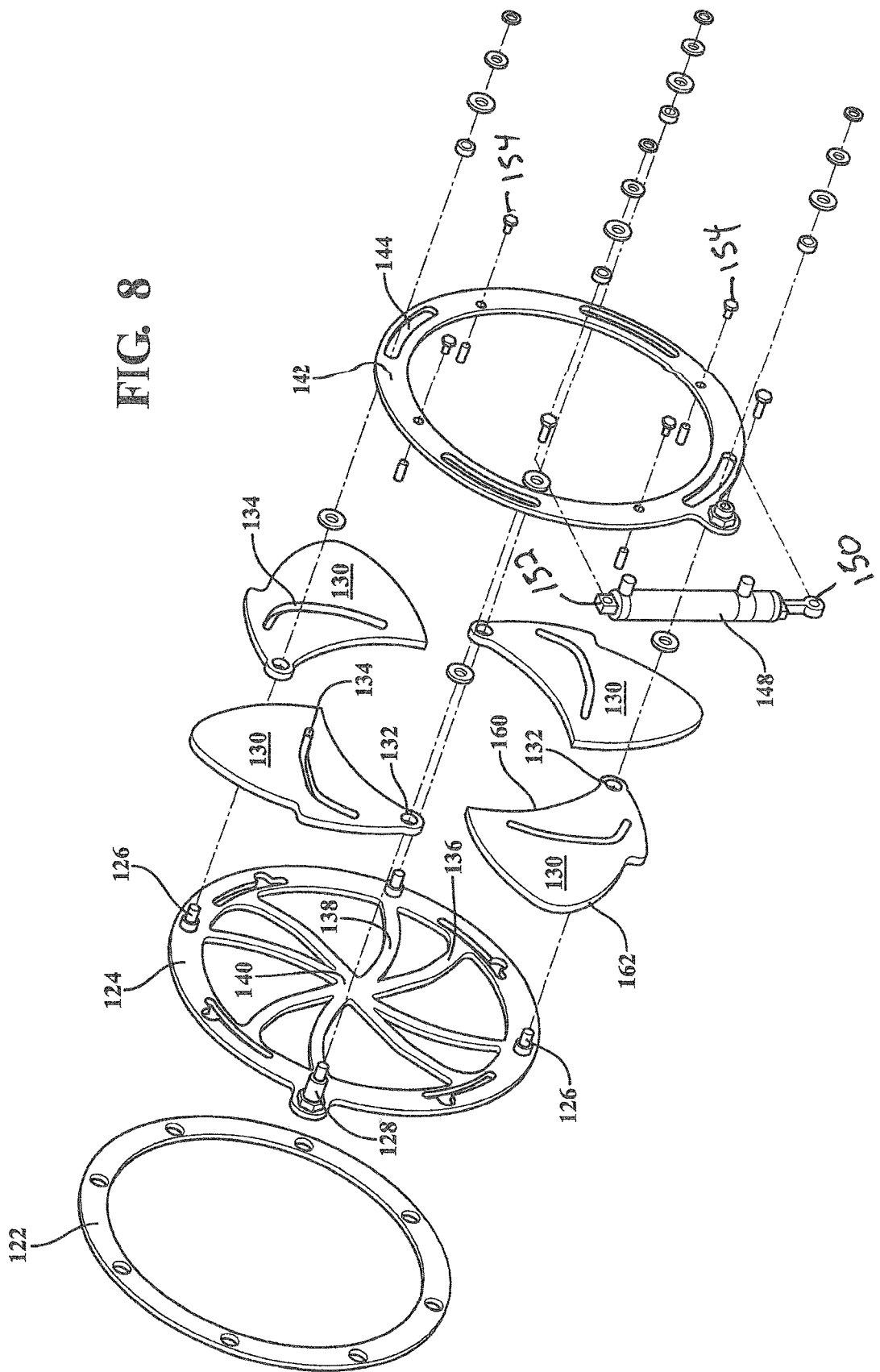
FIG. 8 is an exploded view of inlet gate mechanism for a dryer unit in accordance with an aspect of the present disclosure.

According to an aspect, as the cylinder rod 148 is actuated and moved away from the fully retracted position, the gate mechanism 120 may begin to close off the air inlet 104. As shown in FIG. 6, as the cylinder rod 148 begins to extend, the outer drive ring 142 is moved (rotated) with respect to the inner spoke ring 124 in a counter-clockwise direction as generally indicated by Arrow A. According to an aspect, the inner cylinder mount 128 remains stationary and the outer cylinder mount 146 moves to rotate the drive ring 142 in a counter-clockwise direction. As the drive ring 142 rotates, the drive slots 144 can slide with respect to the pedal pivots 126. As shown, the pedal pivots 126 may be generally disposed in the middle of the drive slots 144. As the drive ring 142 rotates, the drive pins 154 can move therewith and cause the shutoff pedals 130 to pivot inward about their inner attachment point 132. As the shutoff pedals 130 pivot to cover the air inlet 104, the pedal drive pins 154 move within (along a length of) the pedal drive slots 134.

According to a further aspect, as the cylinder rod 148 is moved to the fully extended position (shown in FIG. 7), the air inlet 104 may be fully closed such that air cannot be drawn into the housing 102. When the cylinder rod 148 is in the fully extended position, the outer drive ring 142 can be fully rotated such that the drive slots 144 can be moved to a position where the pedal pivot points 126 are located at the second edge 158 of the drive slots 144. In this position, the shutoff pedals 130 have pivoted about their attachment points 132 to a position where the shutoff pedals 130 can mate to fully close off the air inlet 104. The interaction of the drive pins 154 with the pedal drive slots 134 assist with the movement of the shutoff pedals 130 to a fully closed position where the shutoff pedals 130 contact each other. More specifically, a front edge 160 of one shutoff pedal 130 contacts a back edge 162 of an adjacent shutoff pedal 130. It will also be appreciated that the edges 160, 162 of adjacent shutoff pedals 130 can overlap one another to prevent airflow through the air inlet 104.

Figure 9:
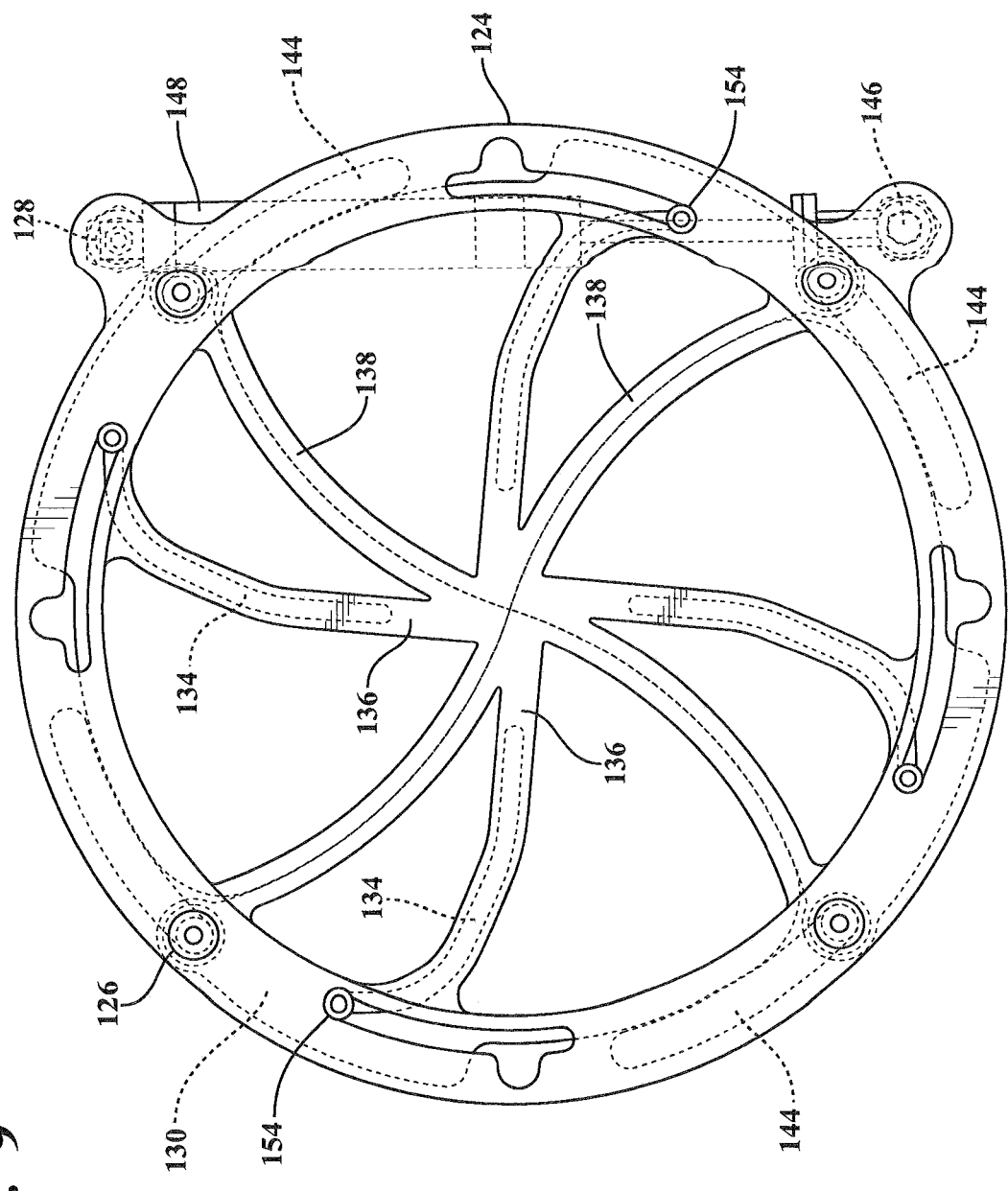
FIG. 9 is a rear view of an inlet gate mechanism for a dryer unit in a closed position in accordance with an aspect of the present disclosure.

According to an aspect and with reference to FIG. 9, when the gate mechanism 120 is in the fully closed position, a respective one of the pedal drive slot sealing spokes 136 can be disposed behind each of the pedal drive slots 134 such that air cannot be drawn into the air inlet 104 through the open pedal drive slots 134 when in the fully closed position. As also shown in FIG. 9, the pedal edge sealing spokes 138 can lie behind the location where the edges 160 and 162 of adjacent shutoff pedals 130 meet. This can also serve to prevent air from being drawn into the air inlet 104 through any gap between the edges 160, 162.

The gate mechanism 120 can be in communication with a controller 170 to effectuate actuation of the cylinder rod 148 between the retracted position and the extended position in order to open and close the air inlet 104. This allows the dyer unit 100 to significantly reduce the amount of work being done without requiring the motor unit 108 to be turned on and off. In other words, when the gate mechanism 120 is in the closed position, air is prevented from being drawn into the air inlet 104 and thus out the air outlet 106 despite the motor unit 108 continuing to run. This allows for the dryer unit 108 to be selectively operated only when necessary, which results in decreased energy use and thus decreased operating costs for the wash system.

According to another aspect, controller 170 may be in communication with a sensor 172 or other detecting device that can determine the location of a vehicle with respect to the vehicle treatment area. Based on the detected location of a vehicle as received from the detecting device, the controller 170 can direct the gate mechanism 120 to open or close off the air inlet 104. According to an aspect, the controller 170 can direct the gate mechanism 120 to close off the air inlet 104 when there is no vehicle located in the vehicle treatment area or adjacent the dryer unit 100. It will also be appreciated that the detection device may also be configured to detect a vehicle configuration and direct the opening and closing of the gate mechanism 120 based on this information. For example, the detection device can detect that a vehicle in the vehicle treatment area is a pickup truck or open bed truck. Armed with this information, the controller 170 can direct the gate mechanism 120 to open the air inlet 104 for drying the front portion and cab of the truck and also to close off the air inlet 104 such that no air is blown into the open bed of the truck. This can prevent disturbing any items in the bed of the pickup truck.

Note that not all of the activities described above in the general description or the examples are required, that a portion of a specific activity may not be required, and that one or more further activities may be performed in addition to those described. Still further, the orders in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A dryer assembly for a vehicle wash, comprising:
   a housing having an air inlet and an outlet;
   a motor assembly disposed adjacent the air inlet and configured to draw air into the housing; and
   a gate mechanism in communication with the air inlet, the gate mechanism including a plurality of pedals that are configured to move substantially in a plane between a first position where the plurality of pedals are positioned to allow air to flow through the air inlet and a second position where the plurality of pedals are substantially disposed over the air inlet to block air from flowing into the housing through the air inlet;
   wherein the gate mechanism further comprises a plurality of sealing spokes configured to overlie a portion of the air inlet and further configured to lie behind an intersection of adjacent ones of the plurality of pedals when disposed in the second position.

2. The dryer assembly of claim 1, wherein the plurality of pedals are generally pivotable between the first position and the second position.

3. The dryer assembly of claim 1, wherein the motor assembly is an electric motor and is in communication with an impeller that rotates to draw air into the air inlet.

4. The dryer assembly of claim 1, wherein the gate mechanism is disposed on an outer surface of the housing.

5. The dryer assembly of claim 1, wherein, in the first position, the plurality of pedals are moved to a position such that a forward surface of each pedal is disposed adjacent a perimeter of the air inlet.

6. The dryer assembly of claim 5, wherein, in the first position, a trailing surface of each of the plurality of pedals remains within a footprint of the housing.

7. The dryer assembly of claim 1, wherein the gate mechanism includes a stationary ring secured to the housing adjacent a perimeter of the air inlet.

8. The dryer assembly of claim 1, further comprising:
   an actuator in communication with the plurality of pedals to selectively move them between the first position and the second position.

9. The dryer assembly of claim 8, wherein the actuator is a hydraulic cylinder.

10. The dryer assembly of claim 8, wherein the actuator is in communication with a controller, which is configured to direct the actuator to move the plurality of pedals to the first position when a vehicle is in a first predetermined position with respect to the dryer assembly and configured to direct the actuator to move the pedals to the second position when the vehicle is in a second predetermined position with respect to the dryer assembly.

11. The dryer assembly of claim 1, wherein the sealing spokes are configured to lie behind each intersection of adjacent ones of the plurality of pedals when disposed in the second position, wherein the plurality of sealing spokes includes a quantity of sealing spokes that is the same as a quantity of pedals, wherein the sealing spokes extend along a path corresponding to a path defined by the intersection of adjacent ones of the plurality of pedals.

12. The dryer assembly of claim 1, wherein each of the plurality of pedals include an inner surface that has a generally arcuate shape.

13. A dryer assembly for emitting high velocity air onto an exterior surface of a vehicle, comprising:
   a housing having an air inlet and an outlet;
   a motor assembly disposed adjacent the air inlet and configured to draw air into the housing; and
   a gate mechanism secured to an outer surface of the housing adjacent a perimeter of the air inlet, the gate mechanism in communication with the air inlet and including a plurality of pedals that are selectively movable between a first position where the plurality of pedals are disposed in a position generally outwardly with respect to the perimeter of the air inlet such that air is permitted to flow through the air inlet and a second position where the plurality of pedals are substantially disposed over the air inlet in order to block air from flowing into the housing through the air inlet;
   wherein the pedals each include a pedal drive slot formed in a face thereof, the pedal drive slots overlaying the air inlet when the pedals are in the second position and configured to move along a pedal drive pin when the pedals move from the second position to the first position;
   wherein the gate mechanism includes a plurality of slot sealing spokes configured to lie behind the pedal drive slots when the plurality of pedals are disposed in the second position.

14. The dryer assembly of claim 13, wherein the gate mechanism further includes an inner stationary ring secured to the outer surface of the housing and an outer ring that is rotatably secured to the inner ring; and
   wherein the plurality of pedals are pivotally secured to the inner ring.

15. The dryer assembly of claim 14, further comprising:
   an actuator in communication with the inner ring and the outer ring to cause rotation of the outer ring with respect to the inner ring thereby pivoting the plurality of pedals between the first position and the second position.

16. The dryer assembly of claim 15, wherein the actuator is a cylinder having a first end secured to the inner ring and a second end secured to the outer ring, and wherein, in a retracted position of the cylinder, the plurality of pedals are disposed in the first position and wherein, in an extended position of the cylinder, the plurality of pedals are disposed in second position.

17. The dryer assembly of claim 15, wherein the outer ring includes a plurality of drive pins that each communicate with a respective one of the plurality of pedals and assist in pivoting the plurality of pedals from the first position to the second position.

18. The dryer assembly of claim 17, wherein the drive pins each slide within the pedal drive slot.

19. The dryer assembly of claim 14, wherein the inner ring includes a plurality of sealing spokes extend inwardly from a perimeter of the inner ring, wherein the plurality of sealing spokes are configured to lie behind each intersection of adjacent ones of the plurality of pedals when the plurality of pedals are disposed in the second position, wherein the plurality of sealing spokes includes a quantity of sealing spokes that is the same as a quantity of pedals, wherein the sealing spokes extend along a path corresponding to a path defined by the intersection of adjacent ones of the plurality of pedals.

20. The dryer assembly of claim 18, wherein the inner ring includes the plurality of slot sealing spokes which are configured to line up with the pedal drive slots.

21. A dryer assembly for a vehicle wash system for emitting high velocity air onto a vehicle exterior, comprising:
- a housing having an air inlet and an outlet;
- a motor assembly disposed adjacent the air inlet having an operating and a non-operating mode;
- a gate mechanism in communication with the air inlet and including a plurality of pedals that are each pivotable between a first position and a second position;
- a controller in communication with the gate mechanism, the controller configured to direct movement of the plurality of pedals from the first position where the plurality of pedals surround the inlet opening such that air can flow into the housing and the second position where each of the plurality of pedals covers a portion of the inlet opening such that in their entirety the plurality of pedals obstruct the inlet opening to prevent air for flowing into the housing; and
- wherein the controller is configured to direct the plurality of pedals to move between the first and second positions while the motor is in the operating mode;
- wherein the gate mechanism includes a plurality of sealing spokes generally located at an intersection of adjacent ones of the plurality of pedals.

22. The dryer assembly of claim 21, wherein each of the plurality of pedals includes a leading surface that generally matches a shape of a trailing surface of an adjacent one of the plurality of pedals.

23. The dryer assembly of claim 22, wherein the leading surfaces and the trailing surfaces each have a generally arcuate shape.

24. The dryer assembly of claim 21, wherein the gate mechanism includes 4 pedals that each are configured to cover about a quarter of the inlet opening in the second position.

25. The dryer assembly of claim 21, wherein the motor assembly is an electric motor assembly and includes an impeller disposed within the housing.

26. The dryer assembly of claim 21, wherein the gate mechanism is disposed on an outer surface of the housing.

27. The dryer assembly of claim 21, wherein, in the first position, a leading edge of each of the plurality of pedals is moved to a position adjacent a perimeter of the air inlet.

28. The dryer assembly of claim 27, wherein, in the first position, a trailing surface of each of the plurality of pedals remains within a footprint of the housing.

29. The dryer assembly of claim 21, wherein the gate mechanism further includes an inner stationary ring secured to the outer surface of the housing and an outer ring that is rotatably secured to the inner ring; and
- wherein the plurality of pedals are pivotally secured to the inner ring.

30. The dryer assembly of claim 29, further comprising:
- an actuator in communication with the inner ring and the outer ring to cause rotation of the outer ring with respect to the inner ring thereby pivoting the plurality of pedals between the first position and the second position.

31. The dryer assembly of claim 30, wherein the actuator is a cylinder having a first end secured to the inner ring and a second end secured to the outer ring, and wherein, in a retracted position of the cylinder, the plurality of pedals are disposed in the first position and wherein, in an extended position of the cylinder, the plurality of pedals are disposed in second position.

32. The dryer assembly of claim 30, wherein the outer ring includes a plurality of drive pins that each communicate with a respective one of the plurality of pedals and assist in pivoting the plurality of pedals from the first position to the second position.

33. The dryer assembly of claim 32, wherein the drive pins each slide within a slot formed in a face of a respective one of each of the plurality of pedals.

* * * * *